Patented May 28, 1935

2,002,519

UNITED STATES PATENT OFFICE 2,002,519

PROCESS FOR THE ISOLATION OF WATER-SOLUBLE VITAMINS

Richard J. Block, New York, N. Y., and George R. Cowgill, Hamden, Conn., assignors to Simon J. Dannenberg, New York, N. Y.

No Drawing. Application April 20, 1932, Serial No. 606,514

6 Claims. (Cl. 167—81)

Our invention relates to the isolation of vitamins and refers particularly to processes for the isolation of the water-soluble vitamins from substances containing them.

Numerous attempts have been made to separate the water-soluble vitamins and especially the antineuritic vitamin from substances containing them, but these have proved ineffectual chiefly because of the partial decomposition of the vitamins during the process or because the final product contained deleterious plant or animal bases, amines, and other impurities which rendered the product undesirable for, or impossible of, correct and safe injection.

We have found, however, that oxidizing compounds, while not affecting the quantity content of the antineuritic vitamin and other water-soluble vitamins, effectively destroy these impurities, or converts the carbohydrates of high molecular weights into acid, or acid-like, compounds of smaller molecular weights, which latter compounds do not affect the efficiency, or safety, of parenteral injections of the substances thus obtained.

In the following of our process, we prefer to employ a crude vitamin concentrate prepared from rice polish, yeast, wheat germs or other water-soluble vitamin-containing substances, and especially those containing antineuritic vitamin.

A suitable concentrate can be produced by extracting the vitamin-containing substance with water or dilute alcohol, concentrating or evaporating to dryness.

We give the following as examples of the following of our process:

Example 1

A quantity of the above described crude vitamin concentrate solution containing about 30 grams of total solid is acidified with concentrated hydrochloric acid. To this solution, we add an excess of barium chloride until no further precipitate forms and two volumes of 1 to 1 extraction of ethyl alcohol and carbon tetrachloride, respectively, this mixture of ethyl alcohol and carbon tetrachloride having a terniary boiling point of about 61° C. which is lower than the boiling point of either of these compounds. The solution is placed in a fractionating distilling apparatus essentially the same as that described in Organic Syntheses I, 68, 1921—J. Wiley & Sons, except that the mechanical stirrer is replaced by a dropping funnel. The solution is heated to a gentle boiling and 125 c. c. of hydrogen peroxide are added and the solution continued at gentle boiling until no further "water" distillate is obtained. The precipitate salts are then removed by filtration and the solvents and excess acid are removed by concentration, preferably in vacuo. During this process practically all of the undesirable substances are removed as the solution has been changed from an aqueous solution to an alcohol solution.

Example 2

The same as Example 1 except that 21 c. c. of fuming nitric acid are substituted for the 125 c. c. of hydrogen peroxide.

Example 3

The same as Example 1 except that 12.5 grams potassium bichromate are substituted for the 125 c. c. of hydrogen peroxide.

Example 4

The same as Example 1 except that 31 grams potassium permanganate are substituted for the 125 c. c. of hydrogen peroxide.

Example 5

The same as Example 1 except that the carbon tetrachloride is substituted by an equal quantity of chloroform and the 125 c. c. hydrogen peroxide are substituted by 62 grams sodium p-toluene-sulphochloramide (chloramine T).

In place of the ethyl alcohol mentioned in the cited examples, we can employ other alcohols, among which are n-propyl alcohol, isopropyl alcohol, allyl alcohol, n-butyl alcohol, tertiary butyl alcohol and tertiary amyl alcohol.

Instead of the mentioned carbon tetrachloride and chloroform, we can employ other solvents which will produce a terniary boiling point mixture with an alcohol and water.

Among the oxidizing products which we have found suitable for employment in our process are nitric acid, chromic acid, hydrogen peroxide, potassium permanganate, chloramine T, sodium hypochloride and potassium bichromate.

In the foregoing examples, we have indicated the oxidation during the step of treatment with the alcohol-tetrachloride or alcohol-chloroform, but the oxidation can also be accomplished either before or after this alcohol-solvent step of procedure.

The operation can also be performed in the presence of water and alcohol, without a solvent such as carbon tetrachloride or chloroform, but in this process the proportion of alcohol to water must be maintained by the addition of large amounts of absolute alcohol.

The addition of barium chloride may be omitted, but we prefer to employ it as it appears to prevent the formation of poisonous products.

We do not limit ourselves to the particular chemicals, quantities, temperatures, times or steps of procedure specifically mentioned as these are given simply as a means for clearly describing the process of our invention.

What we claim is:—

1. In a process for the isolation of water-soluble antineuritic vitamins from materials containing them, the steps which consist in oxidizing the impurities in the presence of an organic solvent for the vitamins and separating the vitamin solution from the precipitated impurities.

2. In a process for the isolation of water-soluble antineuritic vitamins from materials containing them, the steps which consist in oxidizing the impurities in the presence of an alcohol-containing organic solvent for the vitamins having a terniary boiling point and separating the vitamin solution from the precipitated impurities.

3. In a process for the isolation of water-soluble antineuritic vitamins from materials containing them, the steps which consist in oxidizing the impurities in the presence of an alcohol-carbon tetrachloride solvent for the vitamins having a terniary boiling point and separating the vitamin solution from the precipitated impurities.

4. In a process for the isolation of water-soluble antineuritic vitamins from materials containing them, the steps which consist in oxidizing the impurities in the presence of an organic solvent for the vitamins and barium chloride and separating the vitamin solution from the precipitated impurities.

5. In a process for the isolation of water-soluble antineuritic vitamins from materials containing them, the steps which consist in oxidizing the impurities in the presence of an alcohol-containing organic solvent for the vitamins having a terniary boiling point and barium chloride and separating the vitamin solution from the precipitated impurities.

6. In a process for the isolation of water-soluble antineuritic vitamins from materials containing them, the steps which consist in oxidizing the impurities in the presence of an organic solvent for the vitamins and barium chloride, and separating the vitamin solution from the precipitated impurities.

RICHARD J. BLOCK.
GEORGE R. COWGILL.